United States Patent [19]
Cofer

[11] 3,951,287
[45] Apr. 20, 1976

[54] TIRE CART

[76] Inventor: Robert E. Cofer, 1011 Central, Dodge City, Kans. 67801

[22] Filed: Dec. 16, 1974

[21] Appl. No.: 533,179

[52] U.S. Cl............................. 214/331; 214/672; 214/332
[51] Int. Cl.².......................................... B65G 7/00
[58] Field of Search........... 214/330, 331, 332, 333, 214/670, 671, 672, 660, 731

[56] References Cited
UNITED STATES PATENTS

| | | | |
|---|---|---|---|
| 2,490,233 | 12/1949 | Schildmeier | 214/331 |
| 2,795,347 | 6/1957 | Schenkelberger | 214/750 |
| 2,867,341 | 1/1959 | Tieslau | 214/672 |
| 3,027,033 | 3/1962 | Schuster | 214/731 |
| 3,145,859 | 8/1964 | Barosko | 214/331 |

Primary Examiner—Albert J. Makay
Assistant Examiner—Lawrence J. Oresky
Attorney, Agent, or Firm—John H. Widdowson

[57] ABSTRACT

A dolly to receive and hold tires or wheel assemblies for removing or replacing same on a vehicle such as a tractor has a frame with an open front. A lift assembly is mounted on the frame. Stanchion members are secured to the lift assembly and extend upward. A cross member is mounted on the stanchion members. This cross member is movable relative the frame. Lift arms are mounted on the cross member and extend toward the front. In an embodiment a connector joins the lift assembly and the frame for tilting the stanchion members relative to the frame.

3 Claims, 10 Drawing Figures

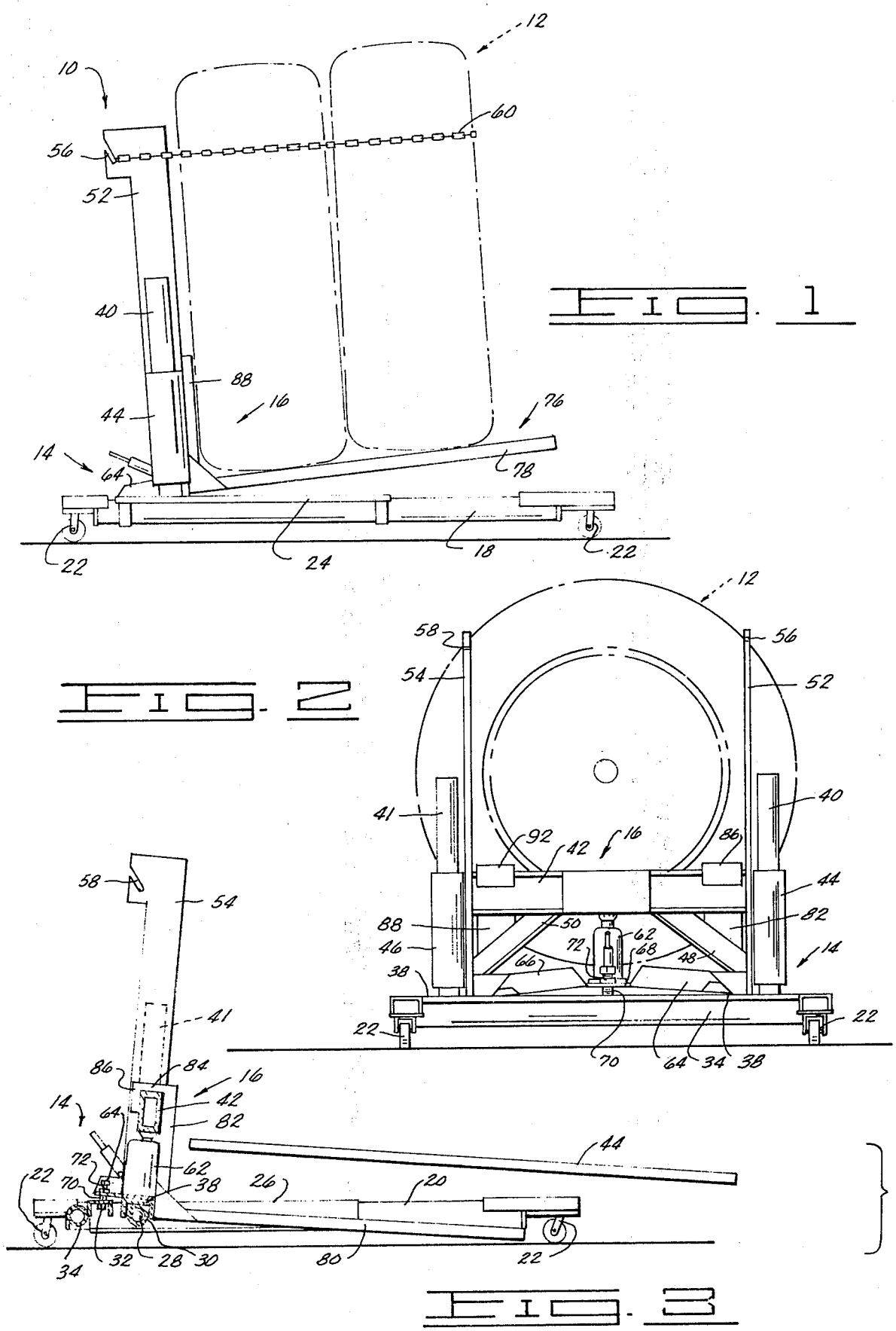

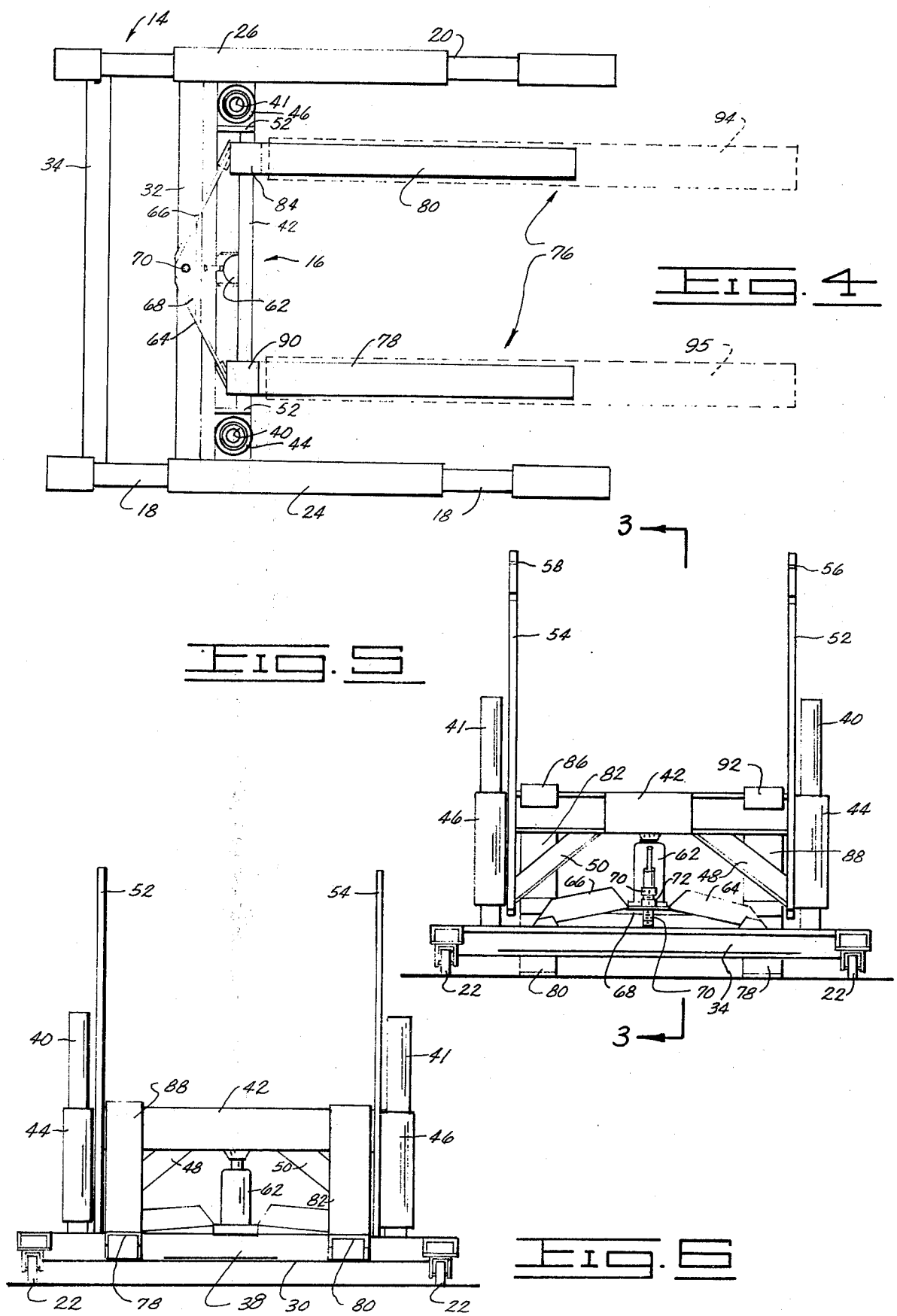

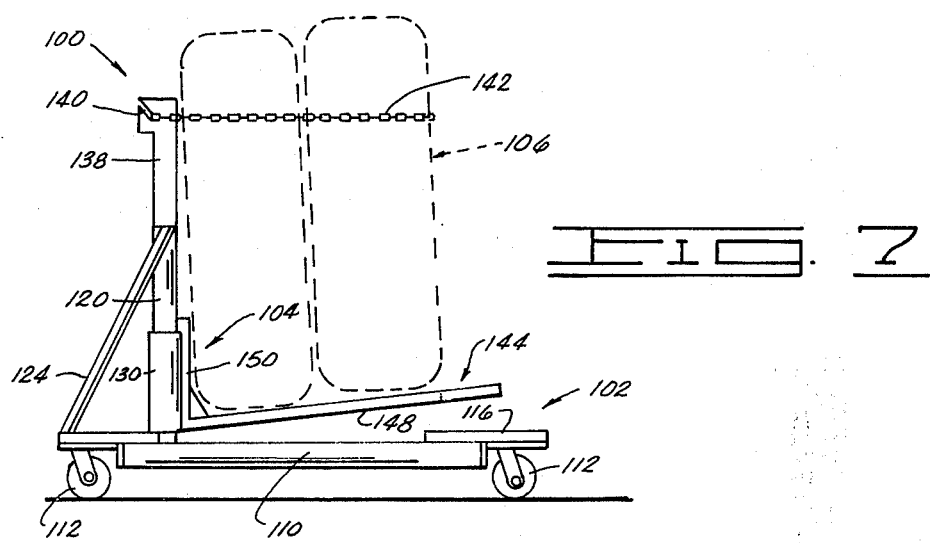
FIG. 7
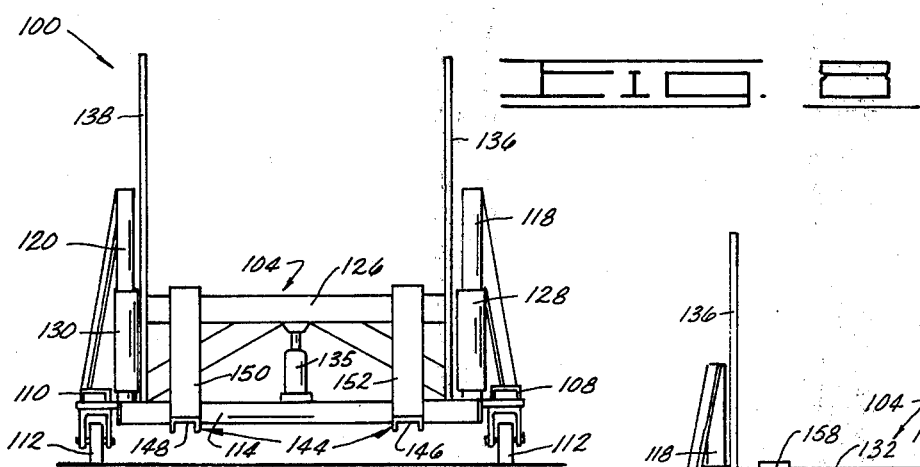
FIG. 8
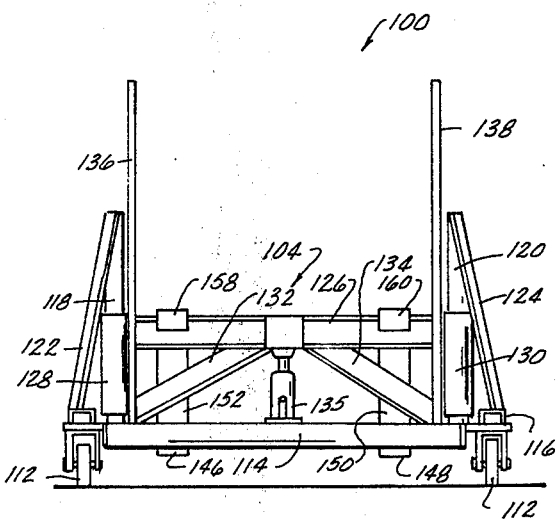
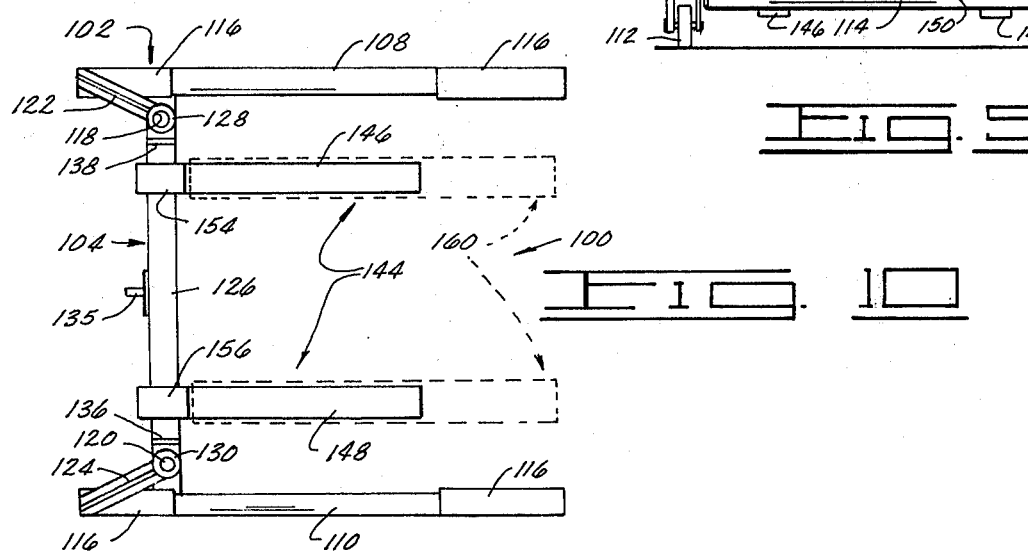
FIG. 9
FIG. 10

TIRE CART

BACKGROUND OF THE INVENTION

This invention is related to wheeled dollies which are used for removing, temporarily storing and mounting of vehicle wheels such as tractor wheels, truck wheels and the like. More specifically, the invention is related to dollies which have a lifting frame portion and are used in the removal and installation of large vehicle wheels. Several prior art devices are known for use in removing and mounting large vehicle wheels on trucks, tractors, and the like. These prior art devices are constructed with a main frame having upright standards and a second frame supported on the main frame and movable up and down on the upright standards. Some of the prior art devices have no structure which will enable the lifting frame thereof to be tilted. Tilting is advantageous and often necessary in removing and mounting the large wheels. Those devices which do have tiltable frames involve a complex structure of jacks and locks to tilt and retain the structure in a tilted position. The prior art tiltable devices are positionable in predetermined positions only and they are not adjustable between these positions. The devices with tilting means are generally quite prone to mechanical failure due to the complicated locking mechanism. Also, nearly all of the prior art devices use rollers and/or sliding joints on the uprights of the frame. After a period of years these usually become dirty and slightly bent, thus difficult to use or inoperative. Also, the locks, etc., can be easily jammed or broken if slightly abused.

SUMMARY OF THE INVENTION

In one specific embodiment, a dolly structure is provided with a U-shaped frame having spaced sides and an open front with casters on the bottom thereof. A lift frame is longitudinally movably mounted on the sides of the U-shaped frame and it has a cross member with a sleeve rotatably mounted thereon. The lift frame has a pair of parallel stanchion members mounted on the sleeve and extending upward. A second cross member is slidably mounted on the stanchion members and it is raised and lowered by a jack or the like. A pair of arms are transversely movably mounted on the second cross member and extend forwardly to in use reach underneath a tire or the like. An adjustable coupler between the lift frame and the frame provides for adjustably tilting the lift frame relative to the ground for the purpose of tilting a wheel when it is supported by the structure.

In another specific embodiment, a dolly structure is provided with a U-shaped frame having sides and an open front with casters. A lift frame having a pair of stanchion members is mounted on the frame with the stanchion members adjacent the frame sides. A cross member is slidably mounted on the stanchion members and it is raised and lowered by a jack or the like. A pair of arms are transversely movably mounted on the cross member and extend forwardly to in use reach underneath a tire or the like.

One object of this invention is to provide a tire cart or dolly structure overcoming the aforementioned disadvantages of the prior art devices.

Still, one other object of this invention is to provide a tire cart or dolly structure having an adjustably tiltable lift frame which pivots transversely relative to the frame of the cart.

Still, another object of this invention is to provide a tire cart structure which has a U-shaped frame that has a longitudinally movably mounted lift frame that is equipped with transversely movable lifting arms that can be extended to accommodate large multiple wheel assemblies.

Still, another object of this invention is to provide a tire cart whihch has a U-shaped frame that has rigidly mounted stanchion members which vertically movably mount a pair of lifting arms for handling vehicle wheels.

Still, another object of this invention is to provide a tire cart structure which has a rugged construction, a minimum number of moving parts and which is constructed and adapted to be used for handling large size weighted or liquid filled tractor tires or the like.

Various other objects, advantages, and features of the invention will become apparent to those skilled in the art from the following discussion, taken in conjunction with the accompanying drawings, in which:

DESCRIPTION OF THE DRAWINGS

FIG. 1 is a side elevation view of an embodiment of the tire cart of this invention with the lift frame in a raised and tilted position. A set of dual wheels are shown on the lift frame in dashed lines;

FIG. 2 is a rear elevation view of the tire cart with the wheels as shown in FIG. 1;

FIG. 3 is a sectional slide elevation view of the tire cart shown in FIG. 1 with the lift frame in a lowered and downward tilted position. This view is taken through a mid portion of the structure as indicated by line 3—3 in FIG. 5. The extension for the shown arm of the lift frame is shown in a spaced relation above the arms of the lift frame;

FIG. 4 is a top plan view of the tire cart shown in FIG. 1 alone with stanchions in a vertically disposed position. Extension members for the arms are shown in dashed lines;

FIG. 5 is a rear elevation view of the tire cart shown in FIG. 1 with the lift frame in the downwardly tilted position as shown in FIG. 3;

FIG. 6 is a front elevation view of the tire cart shown in FIG. 1 with the lift frame having the arms in a horizontal position and the stanchions in an upright position as shown in FIG. 4;

FIG. 7 is a side elevation view of another embodiment of the tire cart in the invention with the lift frame shown in a raised position. A dual wheel assembly is shown on the lift frame in dashed lines;

FIG. 8 is a front elevation view of the tire cart shown in FIG. 7 with the lift frame in a lowered position;

FIG. 9 is a rear elevation view of the tire cart shown in FIG. 8; and

FIG. 10 is a top plan view of the tire cart shown in FIG. 7. Extension members for the arms are shown in dashed lines.

The following is a discussion and description of preferred specific embodiments of the tire cart structure of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENTS

Referring to the drawings in detail and in particular to FIG. 1 which shows a tire cart, (1), of this invention, indicated generally at 10, with a set of dual wheels, indicated generally at 12, supported thereon. The tire cart 10 includes a U-shaped frame, indicated generally at 14 which rests on the ground and supports a lift frame structure, indicated generally at 16. In use the lift frame 16 supports the wheel 12.

The frame 14 is U-shaped with the front being open and a transverse member at the rear. The frame 14 has sides 18 and 20 with caster wheels 22 on the opposed end of each side. The side members 18 and 20 are essentially parallel and rigidly secured to the transverse member 23 as shown in FIG. 4. Preferably, the side members 18 and 20 are tubular with the end portions having a caster mount constructed as shown. The casters 22 are fully rotatable to provide for easy manipulation of the tire cart 10.

The lift frame 16 is longitudinally movably mounted on the frame 14. The lift frame 16 has side members 24 and 26 slidably movably mounted on the frame sides 18 and 20, respectively. The lift frame side members are connected by a cross member 28 that is rigidly secured therebetween. The side members 24 and 26 preferably each have an inner portion disposed between the frame sides 18 and 20 and an upper portion resting on top of the frame sides 18 and 20. Each end of each side member 24 and 26 has a loop extending around the frame sides 18 and 20 as shown to function as a retainer for keeping the side members 24 and 26 on the frame sides.

The cross member 28 is externally cylindrical and has a sleeve 30 pivotally mounted thereon. Another cross member 32, referred to hereinafter as the third cross member, is rigidly mounted between the side members 24 and 26 and spaced to the rear of cross member 30. A base member 38 is rigidly secured to the sleeve 30 and forms a supporting structure for the upright portions of the lift frame. The base 38 is a channel member having a cross-sectional U-shape that opens downward and is rigidly secured to the sleeve 30. The lift frame 16 has a pair of upright or stanchion members 40 and 41 rigidly secured to the base member 38. The stanchion members 40 mount a vertically movable cross member 42, generally referred to herein as the second cross member. The upright or stanchion members 40 and 41 are rigidly secured to the base member 38 and extend radially from the sleeve 30. The second cross member 42 has sleeve members 44 and 46 rigidly secured to the opposite ends thereof with the sleeves 44 and 46 being slidably mounted on the stanchion members 40 and 41, respectively. The sleeves 44 and 46 are preferably elongated as illustrated in the drawings and have the second cross member 42 attached at their upper end portion and braces 48 and 50 between lower portions of the sleeves 44 and 46 and at mid portion of the second cross member 42.

Upright wheel support members 52 and 54 are rigidly secured to the second cross member 42 and the sleeves 44 and 46, respectively. The upright wheel support members 52 and 54 extend upward a substantial distance above the second cross member 42 to in use provide a support for wheels or tires carried on the cart. The upper end portion of each of these upright members 52 and 54 is provided with a notch 56 and 58, respectively. When one or more wheels are carried on the cart as illustrated in FIG. 1 a chain 60 is looped around the wheel or wheels and links of the chain are engaged in the notches 56 and 58 to secure the wheels on the lift frame 16. Raising and lowering of the lift frame 16 is accomplished by a jack 62 positioned between the mid portion of the second cross member 42 and the base 38 on the sleeve 30. The jack 62 is preferably a hydraulic jack of sufficient capacity to adequately and safely raise and lower large heavy multiple wheel assemblies.

The lift frame has a tilt arm on its lower portion. The tilt arm has arm-like members 64 and 66 rigidly secured to opposed ends of the base 38 that extend rearwardly and are connected at a plate 68 disposed over the third cross member 32. A threaded member 70 is pivotally mounted with the third cross member 32 and extends upward through an aperture in plate 68. A nut 72 is positioned on top of the plate 68 and engaged with the threaded member 70. The threaded member 70 and nut 72 and their connection between the stantionary portion of the lift frame and the movable or tiltable portion of the lift frame provide an adjustable connection between them. This adjustable connection is used to precisely and accurately adjust tilting of the lift frame relative to frame 14 and the ground. Tilting the movable portion of the lift frame 16 is accomplished by adjusting the position of the nut 72 on the threaded member 70. Adjusting the position of the nut 72 on the threaded member 70 moves the tilt arm relative to the third cross member 32 and frame 14 which rotates the sleeve 30 on the first cross member 28.

The lift frame 16 has a pair of arms indicated generally at 76 which are transversely movably mounted on the second cross member 42. The arms 76 are positioned underneath a wheel or a wheel assembly when it is on the cart. Each arm of the pair of arms is constructed similarly and the arms are indicated individually at 78 and 80. The arms 76 are generally L-shaped with the elongated portion thereof extending toward the open front and the shorter portion extending upward. The arms 76 are slidably movably mounted on the second cross member so their relative spacing can be adjusted as well as their position in relation to the sides of the frame 14. FIG. 3 shows arm 80 in its mounted position on the second cross member 42. The elongated portion of arm 80 is rigidly secured to an upright portion 82 at the rear thereof. The upper end of the arms is constructed in a hook like fashion and hooked over the second cross member 42. The upper portion of arm 80 has a top 84 rigidly secured to the upper end of the upright portion 82 and a rear portion 86 rigidly secured side the top 84 and extending downward over the back slide of the second cross member 42. The upper end portion of arm 80 is supported by the second cross member 42 and it is slidable transversely on the second cross member 42. Arm 78 is constructed similar to arm 80 with the upright portion indicated at 88, the top indicated at 90 and the rear portion indicated at 92. The arms 76 are preferably constructed with at least the elongated portion of the individual arm members 78 and 80 being generally rectangular in external form. The arms 76 are constructed so that they can have arm extension members mounted with the individual elongated portions of the arms to extend the reach of the lift frame 16 so it will accommodate large multiple wheel assemblies. A pair of arm extension members are used to extend the arms 76. One of the arm extension members 94 is shown in FIG. 3 in a displaced and spaced position above arm 80. In FIG. 4 the extension members 94 and 95 are shown in dashed lines in place on the arms 76. The arm extension members are preferably rectangularly shaped channel members which can be easily slipped over the rectangular exterior form of the individual arm members 78 and 80. In practice, the extension members have been elongated U-shaped channel members with an essentially rectangular interior open on one side so they will overlay the arm members 78 and 80. In practice, it has been found that it is not necessary to rigidly secure the extension members to the arm members because the weight of tire or wheel assemblies carried by the cart holds them firmly in place. With the extension members mounted on the arms 76 the lift frame 16 is preferably positioned on the U-shaped frame 14 as far rearward as possible as shown in FIG. 1. This is done so the caster wheels 22 will be spaced as nearly as possible to an equidistant relationship relative to the center of gravity of the load.

The tire cart 10 of this invention can be used for removing the wheels from a vehicle such as a tractor, storing the wheels once they have been removed and in remounting the wheels on the vehicle. To use the tire cart in removing the wheels from a vehicle it is positioned with the lift frame 16 in a downwardly tilted and lowered position as shown in FIGS. 3 and 5 then aligned with the arms 76 adjacent to underneath portions of the tire of the wheel assembly. Once the arms 76 are generally positioned underneath a wheel assembly the lift frame 16 can be tilted and/or raised as necessary to bring the arms 76 and upright standards 50 and 52 in contact with the wheel assembly. Of course, in order to position the tire cart 10 with the arm 76 underneath the wheel it is necessary for the vehicle to be jacked up or otherwise supported so the wheel is off of the ground. The casters 22 on frame 14 facilitate easy movement of the tire cart and positioning of same. When the arms 76 are in place the chain 60 is looped around the wheel or wheels and secured in the notches of the upright members 52 and 54. After the wheels have been unbolted from the hub or the hub assembly disconnected from the vehicle the lift frame 16 is tilted and/or raised as desired to remove the wheel assembly. The jack 62 is used to control the vertical position and the nut 72 of the adjustable connector is used to control tilting. Once the wheel or wheels have been removed from the vehicle the lift frame 16 is tilted to a position somewhat as illustrated in FIG. 1 for temporary storage. In order to tilt the lift frame 16 the mount 72 is turned on the threaded member 70. With a load on the lift frame 16, arranging it in the tilted position causes the wheel or wheels to be urged by their own weight to remain in contact with the upright members 52 and 54 thus be supported in a stable manner. In using the tire cart 10 to replace the wheel or wheels on a vehicle the lift frame is tilted to the appropriate position by adjusting the nut 72 on the threaded member 70 and the jack 62 is used to control the vertical position of the lift frame 16 and the wheel or wheels. Once the wheel or wheels have been secured on the vehicle the chain 60 is removed and the lift frame 16 lowered or appropriately tilted to remove it from the wheel or wheels. A very important feature of this invention is the tilting and lifting features. The structure which tilts and lifts the lift frame is constructed so the lift frame can be precisely and accurately adjusted in its tilted and elevated position. This tilting and lifting feature is extremely helpful to the mechanic who must precisely control the position of large and often extremely heavy wheel assemblies when assembling or disassembling tractors and other vehicles. In practice it has been found that the tilting feature is particularly important because it offers the mechanic an accurate control of the tilted position which is not possible with the prior art devices as discussed hereinabove.

Another embodiment, (2), of the tire cart of this invention is shown in Sheet 3 of the drawings in FIGS. 7–10, and indicated generally at 100. The tire cart 100 contains a U-shaped frame indicated generally at 102, which supports a lift frame structure, indicated generally at 104. The lift frame structure 104 in use supports one or more tires, wheels or wheel assemblies as shown in the dashed lines of FIG. 7, wherein the wheel assembly is indicated at 106.

The U-shaped frame 102 has an open front portion and a transverse member at its rear portion. The frame 102 includes sides 108 and 110 with caster wheels 112 mounted on their opposite ends. The side members 108 and 110 are essentially parallel and they are rigidly secured to the transverse frame member 114 at the rear portion of the frame structure. The side members 108 and 110 have caster wheel mounts on their ends. The caster wheel mounts include members 116 secured to the end portion of the side members 108 and 110 which provide a mounting surface for the fixed base of the casters. Each of the casters have a base which is secured to the mount members 116 and they are fully rotatable in the horizontal direction to provide for movement and manipulation of the tire cart 100.

The lift frame 104 also includes uprights or stanchion members 118 and 120 which are rigidly secured to the cross member 114 and extend upward therefrom. Braces 112 and 124 extend from the mounts 116 to the stanchion members 118 and 120, respectively. The lift frame 104 has a cross member 126 with sleeves 128 and 130 on its opposite ends. The sleeves 128 and 130 are slidably mounted on the stanchion members 118 and 120, respectively. The sleeves 128 and 130 are preferably elongated, as illustrated in the drawing. Cross member 126 is rigidly secured to the sleeves 128 and 130 at their upper end portion with braces 132 and 134 extending between the lower portion of the sleeves 128 and 130, respectively and joined at a mid portion of the cross member 126.

Raising and lowering of the lift frame 104 is accomplished by a jack 135 positioned underneath a mid portion of cross member 126. The jack 135 rests on the frame cross member 114 and its lifting member is positioned underneath the mid portion of cross member 126 so that when the lifting member is extended it will raise the cross member 126 with the sleeves 128 and 130 sliding on the stanchion members 118 and 120, respectively. The jack 135 is preferably a hydraulic type jack of a sufficient capacity to adequately and safely raise and lower large heavy multiple wheel assemblies.

Upright wheel support members 136 and 138 are rigidly secured to the cross member 126 and the sleeves 128 and 130, respectively. The upright wheel support members 136 and 138 extend upward a substantial distance above the cross member 126 to in use provide a rest or support for a wheel assembly carried on the cart. The upper end of each of the wheel support members 136 and 138 is provided with a notch. FIG. 7 shows the notch 140 in the wheel support member 138. When a wheel assembly is carried on the cart as illustrated in FIG. 7 a chain 142 is looped around the wheel assembly, the links of the chain are engaged in the notches in the wheel support members 136 and 138 to secure the wheel assembly.

The lift frame 104 has a pair of arms, indicated generally at 144. In use the arms 144 are supported by the lift frame 104 and the cross member 114 and they are positioned underneath a wheel or wheel assembly to lift or support it. Each arm of the pair of arms 144 is constructed similarly. The individual arms are indicated at 146 and 148. Each arm is generally L-shaped with the elongated portion thereof extending forwardly toward the open front of the tire cart and with the shorter portion extending upward and attached to the cross member 126. The arms 144 are slidably mounted on the cross member 126 so their relative spacing can be adjusted as desired. The mounted position of the arms 144 can be seen in the combination of FIGS. 8, 9, and 10. The shorter portions 150 and 152 of the arms 148 and 146, respectively, are on the forwardly disposed side of cross member 126 and the frame cross member 114. Each of the arms 146 and 148 has a top, indicated at 154 and 156, respectively, which rests on top of cross member 126, and rear portions 158 and 160, respectively, which are positioned on the rearwardly disposed side of cross member 126. The shorter portions 150 and 152, the tops 154 and 156, and the rear portions 158 and 160 of the arms 144 form a hook like structure which hooks over the lift frame cross member 126. It is to be noted that as the lift frame 104 is raised and lowered the lower end portions of the arms shorter portions 150 and 152 rest on the forwardly disposed side of the frame cross member 114 so the elongated portions of the arms 144 are maintained in a generally horizontal position.

The arms 144 are preferably constructed with at least the longest portion of the individual arm members 146 and 148 being rectangular in their external form. The arms 144 are constructed so they can have arms extension members mounted with the individual elongated portions of the arms to extend the reach so that large multiple wheel assemblies can be accommodated by the tire cart 100. A pair of arm extension members are removably mountable with the arms 144 as an option for extending the reach. FIG. 10 shows the arm extension members, indicated generally at 160, in dashed lines mounted with the arms 144. The arm extension members 160 are preferably rectangular shaped channel like members which are slipped over or placed on the rectangular exterior of the individual arm members 146 and 148. The extension members are preferably essentially U-shaped channel members with an essentially rectangular interior which is open on one side so the extension members 160 can overlay the rectangular exterior form of the arm members 160. In practice, it has been found that it is not necessary to secure the extension members 160 to the arms 144 when a tire, wheel or wheel assembly is supported on the tire cart because the wieght of them will hold the extensions 160 firmly in place. It is to be noted that if desired the elongated portions of the arms can be a shape other than rectangular and the extension members can have a shape other than a U-shape, for example, both of the arms and the extensions can be cross-sectionally cylindrical.

The tire cart 100 of this embodiment, (2), of this invention is designed to be used in removing wheels from a vehicle such as a tractor and for storing the wheels once they have been removed, and in remounting the wheels on the vehicle. In using the tire cart 100 to assist in removing the wheels from a vehicle the lift frame 104 is placed in the lowered position with the arms 144 being underneath a tire, wheel, or wheel assembly, as the case may be. Once the arms 144 are positioned underneath the wheel assembly, then the wheel assembly is loosened to permit its removal from the vehicle and the arms 144 are raised by the jack 135 to support the wheel assembly. Before a wheel assembly is actually removed from a vehicle to a displaced position it is preferred for safety reasons that the chain 142 be looped around it and secured to the wheel support member 136 and 138. Once a wheel assembly is secured to the tire cart it can be moved away from the vehicle and easily moved around by virtue of the casters 112. In using the tire cart 100 to replace a wheel assembly on a vehicle the lift frame 104 is adjusted in its vertical position by the jack 135 so that it can be correctly aligned with the axle or lugs on the vehicle to facilitate installation. Once a wheel assembly has been reattached to a vehicle the chain 142 is removed and the lift frame 104 lowered so that it can be removed from the wheel assembly. The lifting feature of the tire cart of this invention is very important because the use of a hydraulic jack 135 to control the vertical position of the lift frame 104 allows a wheel assembly supported to be precisely and accurately vertically adjusted. This feature is extremely helpful to the mechanic who must precisely control the position of a large and often extremely heavy wheel assembly when assembling or disassembling a tractor or other large vehicle.

In the manufacture of both embodiments, (1 and 2), of the tire cart of this invention it is obvious that it can be easily constructed to achieve the end product. In practice the tire carts have been constructed from the standard sizes of materials and with standard components by using common machine shop and fabricating practices. It is to be noted that the tire carts of this invention are rugged and substantially less complicated than prior art tire carts and similar wheel handling devices.

In the use and operation of the tire cart structures of this invention it is seen that same provides a dolly for the handling, storage, and manipulation of tires or wheel assemblies for vehicles. In practice the tire carts of this invention have been used in mechanic shops which exclusively work on both frameless and frame-type agricultural tractors. Both embodiments have in practice been quite successful because of their easily and accurately controllable elevating feature. The tire cart having the tiltable portion has proved to be quite successful because of its accurately controllable tilting features.

As will become apparent from the foregoing description of the applicant's tire cart structures, relatively inexpensive and simple means have been provided to support, transport and temporarily store large tires or wheel assemblies. The tire cart structures are simple and economical to manufacture due to its relatively simple construction. The tiltable embodiment is extremely useful and helpful because of the easily controllable tilting and elevating features of its lift frame.

While the invention has been described in conjunction with preferred specific embodiments thereof, it will be understood that this description is intended to illustrate and not limit the scope of the invention, which is defined by the following claims.

I claim:

1. A dolly comprising:

a. a dolly frame having a U-shaped portion with an open front including a pair of spaced side members and a transverse member secured to the rear portion of the side members, the side members having casters mounted on the end portion thereof, b. a lift frame having oppositely disposed end members longitudinally slidably mounted on said side members and rigidly secured to a first cross member, said lift frame having a pair of standards extending upwardly, said standards in use holding an engaging means for securing a wheel assembly or the like to said lift frame, c. a sleeve member rotatably mounted on said first cross member, d. a pair of spaced essentially parallel stanchion members secured to said sleeve member and extending upward, e. a second cross member slidably mounted on said stanchion members, f. a pair of arms transversly slidably mounted on said second cross member, said arms extending from said second cross member toward said open front and parallel to the side members of said dolly frame, said pair of arms including removable extension members, g. means to raise and lower said second cross member relative to said dolly frame, and h. tilt means having a stationary third cross member rigidly mounted with said lift frame at the rear of said first cross member, a tilt arm member secured to said sleeve member extending over said third cross member, and an adjustable coupler member connecting said tilt arm member and said third cross member, said adjustable coupler member being constructed and adapted to in use adjust the relative position of said tilt arm member and said third cross member for tilting said stanchion members and said second cross member relative to said dolly frame, the dolly is constructed and adapted to in use receive and hold one or more tires, wheel assemblies or the like for removing or replacing the same on a vehicle such as a tractor.

2. The dolly of claim 1, wherein:

a. said second cross member has a pair of sleeve member rigidly mounted on opposed end portions thereof, b. said sleeve members are slidably mounted on said stanchion members, and c. said means to raise and lower said second cross member is a jack positioned between said upper transverse member and said sleeve member.

3. The dolly of claim 2, wherein:

a. said pair of arms each have a hook like upper end portion engaged over said upper transverse member and an L-shaped member attached to said hook like portion with the elongated portion thereof extending toward said open front, and b. said means to engage a chain or the like is a slot in said upper end portion of said standards.

* * * * *